(12) United States Patent
Colbourne et al.

(10) Patent No.: US 10,135,559 B1
(45) Date of Patent: Nov. 20, 2018

(54) M×N WAVELENGTH SELECTIVE SWITCH FOR HIGH DEGREE COUNT (71) Applicant: Lumentum Operations LLC, Milpitas, CA (US)

(72) Inventors: Paul Colbourne, Ottawa (CA); Sheldon McLaughlin, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/685,526

(22) Filed: Aug. 24, 2017

Related U.S. Application Data

(60) Provisional application No. 62/508,725, filed on May 19, 2017.

(51) Int. Cl.
*H04J 14/00* (2006.01)
*H04J 14/02* (2006.01)
*G02B 6/27* (2006.01)
*H04Q 11/00* (2006.01)

(52) U.S. Cl.
CPC .......... *H04J 14/0212* (2013.01); *G02B 6/272* (2013.01); *H04Q 11/0005* (2013.01); *H04Q 2011/0007* (2013.01); *H04Q 2011/0032* (2013.01); *H04Q 2011/0052* (2013.01)

(58) Field of Classification Search
CPC .... G02F 2201/307; G02F 1/011; G02F 1/377; G02F 1/035; G02B 6/356; G02B 6/29311; G02B 6/2931; G02B 6/3512; H04Q 11/0005; H04Q 2011/003; H04Q 2011/0032; H04Q 2011/0016; H04Q 2011/0052; H04J 14/0212
USPC .......................................................... 398/49
See application file for complete search history.

(56) References Cited

U.S. PATENT DOCUMENTS

| | | | |
|---|---|---|---|
| 8,300,995 B2 | 10/2012 | Colbourne | |
| 2004/0252938 A1* | 12/2004 | Ducellier | G02B 6/12011 385/27 |
| 2006/0159395 A1* | 7/2006 | Hnatiw | G02B 6/12011 385/37 |
| 2012/0002917 A1* | 1/2012 | Colbourne | G02B 6/356 385/17 |
| 2012/0219252 A1* | 8/2012 | Marom | G02B 6/3556 385/16 |
| 2018/0128984 A1* | 5/2018 | Yan | G02B 6/3546 |

\* cited by examiner

*Primary Examiner* — Don N Vo
(74) *Attorney, Agent, or Firm* — Harrity & Harrity, LLP (57) ABSTRACT

A wavelength selective switch (WSS) may include a first set of ports, each to launch a respective beam of a first set of beams, wherein the first set of beams is provided to a first position on a focal plane, and wherein a first set of wavelength channel sub-beams, included in a beam of the first set of beams, is to be incident on a particular section of a switching array. The WSS may include a second set of ports, each to launch a respective beam of a second set of beams, wherein the second set of beams is provided to a second position on the focal plane, wherein the second position is different from the first position, and wherein a second set of wavelength channel sub-beams, included in a beam of the second set of beams, is to be incident on the particular section of the switching array.

20 Claims, 6 Drawing Sheets

M×N WAVELENGTH SELECTIVE SWITCH FOR HIGH DEGREE COUNT

RELATED APPLICATION

This application claims priority under 35 U.S.C. § 119 to U.S. Provisional Patent Application No. 62/508,725, filed on May 19, 2017, the content of which is incorporated by reference herein in its entirety.

TECHNICAL FIELD

The present disclosure relates to an M×N wavelength selective switch (WSS) and, more particularly, to an M×N WSS that includes multiple sets of common ports in order to support add/drop at an optical node with a high degree count.

BACKGROUND

An M×N WSS is a device capable of independently routing any wavelength channel (e.g., a wavelength channel included in an optical signal comprising one or more wavelength channels) from any inbound port of the M×N WSS to any outbound port of the M×N WSS. In some cases, an M×N WSS may, along with one or more other devices, be included in an optical node (e.g., a node in a dense wavelength division multiplexed (DWDM) optical communications system) in order to support add/drop of optical signals at the optical node. In such an optical node, use of the M×N WSS may support add/drop such that a given wavelength channel can be added to or dropped from any degree of the optical node.

SUMMARY

According to some possible implementations, a WSS may include a first set of ports, each to launch a respective beam of a first set of beams, wherein the first set of beams is provided to a first position on a focal plane associated with the WSS, and wherein a first set of wavelength channel sub-beams, included in a beam of the first set of beams, is to be incident on a particular section of a switching array of the WSS; and a second set of ports, each to launch a respective beam of a second set of beams, wherein the second set of beams is provided to a second position on the focal plane associated with the WSS, wherein the second position is different from the first position, and wherein a second set of wavelength channel sub-beams, included in a beam of the second set of beams, is to be incident on the particular section of the switching array.

According to some possible implementations, a WSS may include P (P>1) sets of ports, wherein each of a first set of ports, of the P sets of ports, is to launch a respective beam in a first set of beams, wherein the first set of beams is to be provided to a first position on a focal plane, and wherein a first set of wavelength channel sub-beams, included in a beam of the first set of beams, is to be incident on a particular section of a switching array of the WSS; and wherein each of a second set of ports, of the P set of ports, is to launch a respective beam of a second set of beams, wherein the second set of beams is to be provided to a second position on the focal plane, wherein the second position is different from the first position, and wherein a second set of wavelength channel sub-beams, included in a beam of the second set of beams, is to be incident on the particular section of the switching array; and the switching array to steer the first set of wavelength channel sub-beams and the second set of wavelength channel sub-beams using the particular section of the switching array.

According to some possible implementations, a WSS may include a first set of ports, each to receive a respective beam of a first set of beams, wherein the first set of beams is to be received via a first position on a focal plane associated with the WSS, and wherein a first set of wavelength channel sub-beams, included in a beam of the first set of beams, is to be incident on a particular section of a switching array of the WSS; and a second set of ports, each to receive a respective beam of a second set of beams, wherein the second set of beams is to be received via a second position on the focal plane associated with the WSS, wherein the second position is different from the first position, and wherein a second set of wavelength channel sub-beams, included in a beam of the second set of beams, is to be incident on the particular section of the switching array.

DETAILED DESCRIPTION

The following detailed description of example implementations refers to the accompanying drawings. The same reference numbers in different drawings may identify the same or similar elements. The implementations described below are merely examples and are not intended to limit the implementations to the precise forms disclosed. Instead, the implementations were selected for description to enable one of ordinary skill in the art to practice the implementations.

In order to satisfy a demand for increasing data transmission capacity in an optical communications system, a number of optical fibers at a given optical node may be increased. For example, overlay optical fibers may be added between optical nodes in order to increase capacity. Increasing the number of optical fibers at the optical node increases a degree count of the optical node, where the degree count is the number of fiber pairs (transmit and receive) connected to the optical node. Thus, in order to increase capacity at the optical node, M×N WSSs of the optical node must be capable of supporting add/drop for these higher degree counts.

However, using a prior art design, a cost and/or complexity of these M×N WSSs significantly increase when configured to support add/drop at an optical node with a high degree count. For example, in addition to an increase in complexity (e.g., due to a need for additional and/or larger elements), a cost of a 16×26 WSS (suitable for use in an optical node up to 16 degrees) may be approximately twice that an 8×26 WSS (suitable for use in an optical node up to 8 degrees). Thus, a cost per add/drop port of the 16×26 WSS is approximately twice that of the 8×26 WSS (e.g., since the 16×26 WSS has the same number of add/drop ports as the 8×26 WSS, but is approximately twice the cost).

Some implementations described herein provide a design for an M×N WSS that is capable of supporting add/drop at an optical node with a high degree count by including multiple sets of common ports in the M×N WSS (e.g., whereas a prior art M×N WSS includes only one set of common ports). As described in further detail below, inclusion of the multiple sets of common ports provides support for the high degree count, with a relatively small impact on the cost and complexity of the M×N WSS (e.g., as compared to using a prior art design for an M×N WSS in order to support the same high degree count). Thus, capacity at the optical node can be increased without a significant increase in cost or complexity of M×N WSSs in the optical node.

Figure 1:
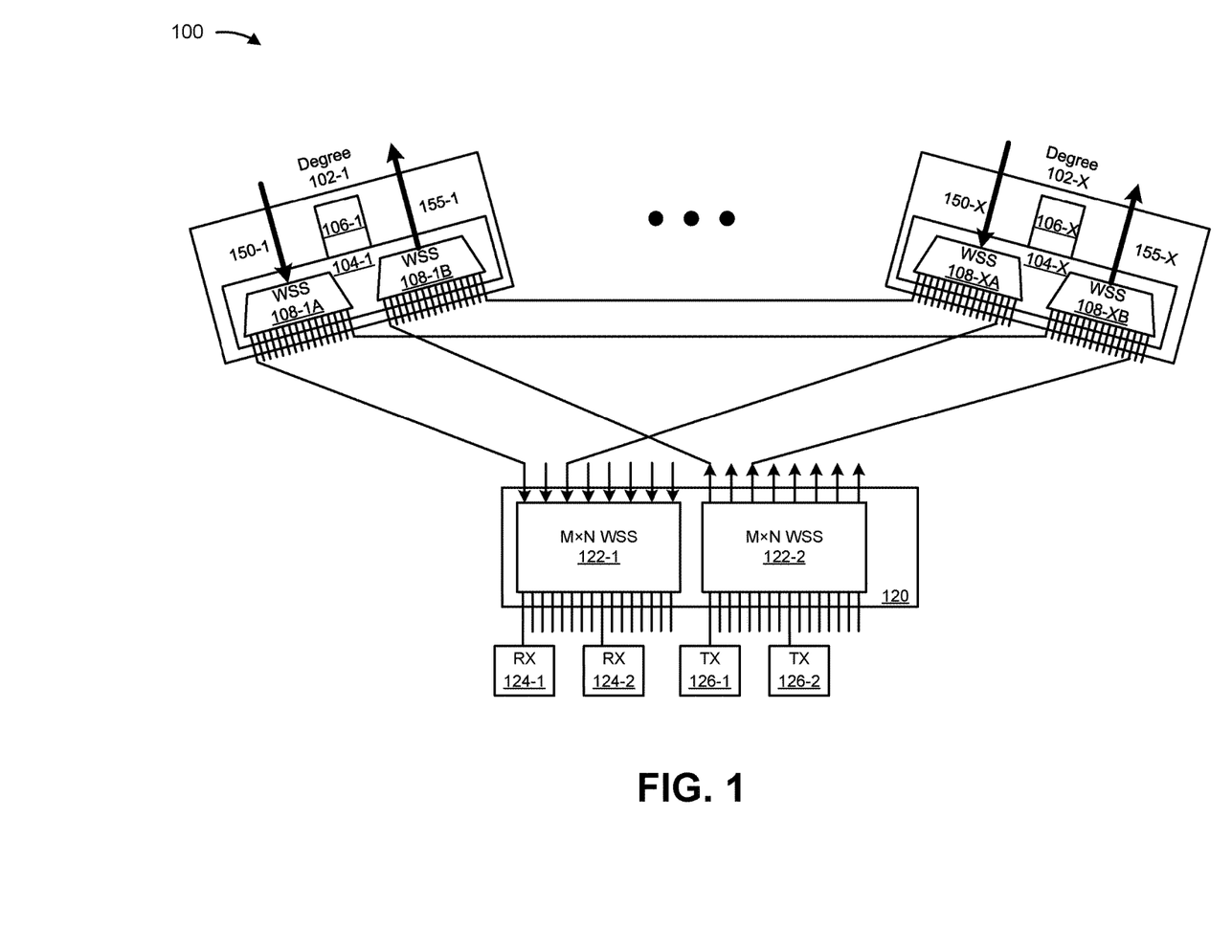
FIG. 1 is a diagram of an optical node including a set of M×N WSSs that support add/drop when the optical node has a high degree count, as described herein.

FIG. 1 is a diagram of an example optical node 100 including a set of M×N WSSs 122 capable of supporting add/drop when optical node 100 has a high degree count. As shown in FIG. 1, optical node 100 includes a set of degrees 102-1 through 102-X (X>1). For example, optical node 100 may include two degrees (X=2), four degrees (X=4), eight degrees (X=8), 16 degrees (X=16), 24 degrees (X=24), 32 degrees (X=32), or more. As shown, each degree 102 includes a multiplexing/demultiplexing stage 104 (e.g., 104-1 through 104-X) and an optical channel monitor 106 (e.g., 106-1 through 106-X). As further shown, each multiplexing/demultiplexing stage 104 includes a pair of WSSs 108 (e.g., WSS 108-1A and WSS 108-1B through WSS 108-XA and WSS 108-XB). As shown, a first WSS 108 of each pair (e.g., WSS 108-1A, WSS 108-XA) is coupled to an input fiber (e.g., 150-1, 150-X) associated with a respective degree 102, while a second WSS of each pair (e.g., WSS 108-1B, WSS 108-XB) is coupled to an output fiber (e.g., 155-1, 155-X) associated with the respective degree 102.

As further shown, optical node 100 includes add/drop stage 120. As shown, add/drop stage 120 includes a set of M×N WSSs 122 (e.g., M×N WSS 122-1 and M×N WSS 122-2). M×N WSS 122 is an add/drop device that supports add/drop of optical signals at optical node 100. In some implementations, M×N WSS 122 is capable of supporting add/drop at optical node 100 with a high degree with a reduced cost and/or complexity (e.g., as compared to a prior art M×N WSS that is capable of supporting add/drop for the same high degree count). Additional details of M×N WSS 122 are described below with regard to FIGS. 2A, 2B, 4, and 5.

As shown in FIG. 1, a first M×N WSS 122 (e.g., M×N WSS 122-1), associated with dropping optical signals at optical node 100, may be coupled to a set of optical receivers (RX) 124. While not shown, in some cases, the first M×N WSS 122 may be coupled to a set of splitters, where the set of splitters is coupled to the set of optical receivers (RX) 124. Similarly, a second M×N WSS 122 (e.g., M×N WSS 122-2), associated with adding optical signals at optical node 100, may be coupled to a set of optical transmitters (TX) 126.

A degree 102 bi-directionally connects optical node 100 to another optical node or an endpoint node of, for example, a DWDM optical communications system. For example, WSS 108-1A may receive an input signal from another optical node via an optical fiber. Here, if a portion of the input signal (e.g., one or more wavelength channels, sometimes referred to as wavelength channel sub-beams) is to be dropped, then WSS 108-1A may selectively provide the portion of the input signal (e.g., an optical signal including the one or more wavelength channels) on a drop path to one or more optical receivers 124 (e.g., a path from WSS 108-1A, via M×N WSS 122-1, to one or more optical receivers 124). Further, if a portion of the input signal is to continue on an outbound optical fiber of another degree 102 (i.e., is not to be dropped), then WSS 108-1A may selectively provide the portion of the input signal on an express path to an outbound WSS 108 associated with the other degree 102 (e.g., a path from WSS 108-1A to WSS 108-XB).

As another example, WSS 108-1B may provide an output signal (e.g., including one or more wavelength channels) to another optical node via an optical fiber. Here, WSS 108-1B may receive the output signal, added at optical node 100, on an add path from optical transmitter 126 (e.g., a path from optical transmitter 126, via M×N WSS 122-2, to WSS 108-1B), and provide an optical signal, including the output signal, via the optical fiber. Similarly, WSS 108-1B may receive a portion of an optical signal on an express path from an inbound WSS 108 (e.g., WSS 108-XA) associated with another degree 102, and may provide an optical signal, including the portion of the optical signal, via the optical fiber.

The number and arrangement of devices shown and described in association with FIG. 1 are provided as examples. In practice, optical node 100 may include additional devices, fewer devices, different devices, differently arranged devices, and/or differently sized devices than those shown in FIG. 1.

Figure 2A:
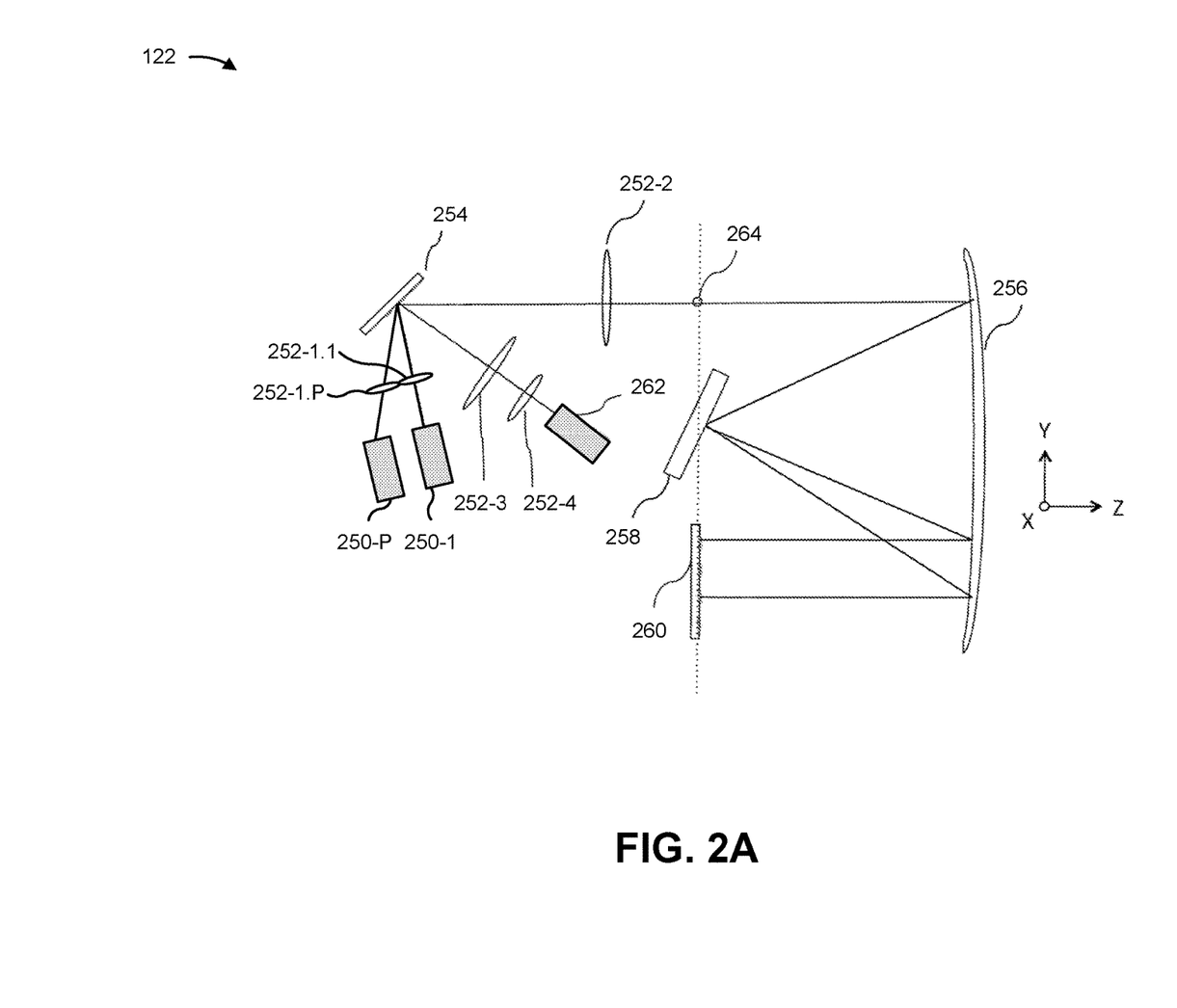
FIGS. 2A and 2B are diagrams of an example implementation of the M×N WSS included in the optical node of FIG. 1.
Figure 2B:
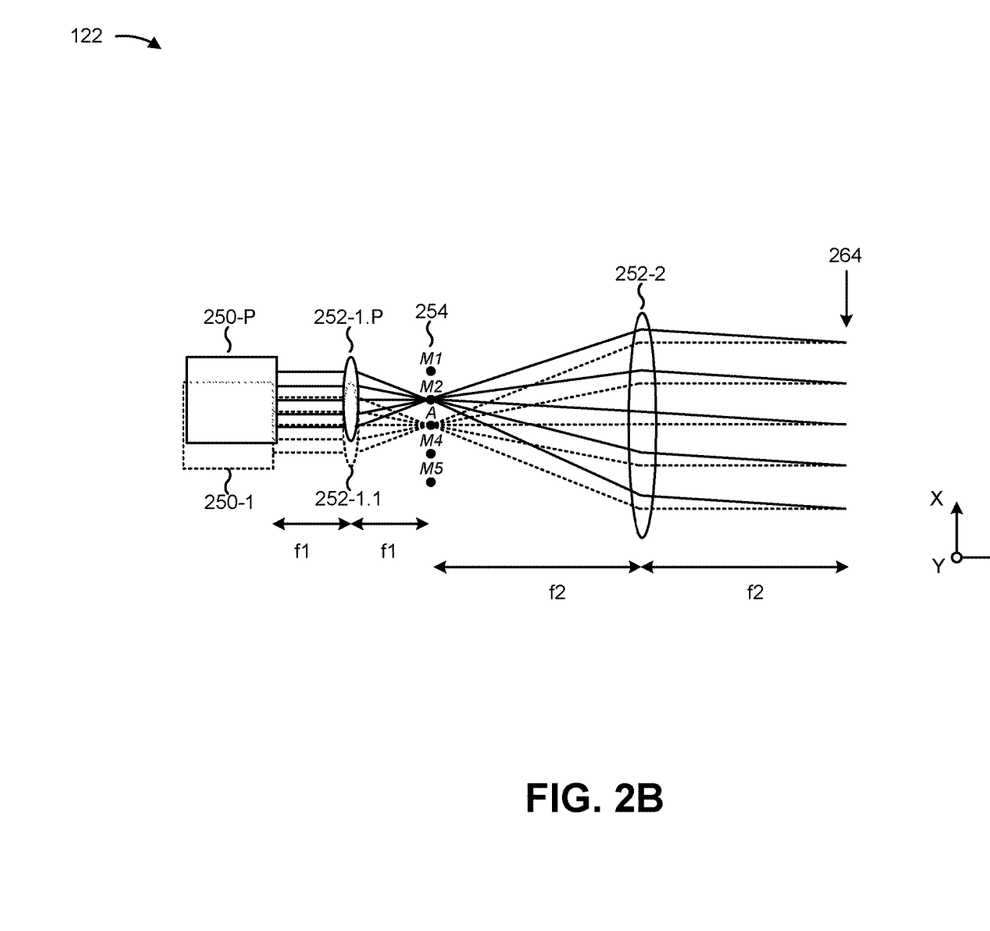

FIGS. 2A and 2B are diagrams of an example implementation of M×N WSS 122 of optical node 100. FIG. 2A is a first view (e.g., corresponding to a y-z plane) of an example arrangement of elements of M×N WSS 122. FIG. 2B is a diagram of a view (e.g., corresponding to an x-z plane) of an example arrangement of a subset of the elements of M×N WSS 122 shown in FIG. 2A (e.g., elements in a front end of M×N WSS 122).

As shown in FIG. 2A, in some implementations, M×N WSS 122 may include multiple port arrays 250 (e.g., port array 250-1 through port array 250-P (P>1)), a set of lenses 252 (e.g., lenses 252-1.1 through 252-1.P, 252-2, 252-3, 252-4), a first switching array 254, a mirror 256, a dispersive element 258, a second switching array 260, and a port array 262. Elements of M×N WSS 122 are described below, followed by a description of an example operation of M×N WSS 122.

Notably, while some examples associated with M×N WSS 122 may be described below in the context of M×N WSS 122 operating with M ports (e.g., ports included in the multiple port arrays 250) functioning as input ports to receive optical signals and N ports (e.g., ports in port array 262) functioning as output ports to drop optical signals, in some implementations, M×N WSS 122 may operate such that the N ports function as input ports to add optical signals and the M ports function as output ports to transmit optical signals, depending upon a direction of propagation of an optical signal.

Port arrays 250 (e.g., port array 250-1 through port array 250-P) include a plurality of port arrays for launching beams of light (e.g., optical signals including one or more wavelength channels) into a switch core of M×N WSS 122, or receiving light launched in the switch core by port array 262. In some implementations, the ports of port arrays 250 (i.e., the ports via which M×N WSS 122 is optically coupled to one or more WSSs 108) may be referred to as common ports of M×N WSS 122, where a given port array 250 comprises a set of common ports.

In some implementations, port arrays 250 include a total of M (M>1) ports. In some implementations, each port array 250, included in the multiple port arrays 250, may include a same number of ports. For example, when M×N WSS 122 includes three port arrays 250 (e.g., P=3), each port array

250 may include a total of M/3 ports (e.g., such that the three port arrays 250 include a total of M ports). Additionally, or alternatively, one or more port arrays 250 may include a different number of ports than one or more other port arrays 250. For example, when M×N WSS 122 includes two port arrays 250 (e.g., P=2), a first port array 250 may include a total of ((M/2)−2) ports and a second port array 250 may include a total of ((M/2)+2) ports (e.g., such that the two port arrays 250 include a total of M ports).

In some implementations, a given port array 250 may be offset from another port array 250 in at least one direction. For example, as shown in FIGS. 2A and 2B, respectively, port array 250-P may be offset from port array 250-1 in a lateral direction (e.g., a direction that is substantially parallel to or along the y-z plane, a direction that is substantially perpendicular to a switching direction of second switching array 260) and in a vertical direction (e.g., a direction that is substantially parallel to an x-axis, a direction that is substantially parallel to a switching direction of second switching array 260). In this example, as shown in FIGS. 2A and 2B, port arrays 250 may be separate port arrays (i.e., physically separated by free-space within M×N WSS 122).

In some implementations, an amount of vertical offset between a given port array 250 and another port array 250 may correspond to a distance between a first position on a focal plane associated with first switching array 254 (e.g., a position on the focal plane at which beams launched by port array 250-1 are focused, such as position A identified in FIG. 2B) and a second position on the focal plane associated with first switching array 254 (e.g., a position on the focal plane at which beams launched by port array 250-P are focused, identified as position M2 in FIG. 2B). In some implementations, as shown in FIG. 2B, a given port array 250 may be offset from another port array by a distance corresponding to one position on the focal plane (e.g., position A and position M2 are adjacent positions). Additionally, or alternatively, a given port array 250 may be offset from another port array by a distance corresponding to multiple positions on the focal plane (e.g., port array 250-P may be offset from port array 250-1 by a distance corresponding to a distance from position A to position M1).

As another example, port array 250-P may be offset from port array 250-1 in the vertical direction and may aligned with port array 250-1 in the lateral direction (e.g., such that port array 250-P is above or below port array 250-1 in a single column in the vertical direction, such that ports of port array 250-P are interleaved with ports of port array 250-1 in a single column in the vertical direction, and/or the like). In this example, port arrays 250 may be included in a single port array (e.g., a single column of ports in a single port array). Additional details and example implementations of such configurations are described below with regard to FIGS. 4 and 5. Alternatively, in another example, port arrays 250 may be included in separate port arrays that are vertically aligned.

In some implementations, the ports of one or more port arrays 250 may be aligned in the vertical direction such that the ports are arranged in a one-dimensional array. For example, as shown in FIG. 2A, ports of port array 250-1 may be aligned in the vertical direction (e.g., in a first column), and ports of port array 250-P may be aligned in the vertical direction (e.g., in a second column). As another example, when port arrays 250 are included in a single port array, ports of port array 250-1 through port array 250-P may be aligned in the vertical direction (e.g., in a signal column).

In some implementations, a particular port of a given port array 250 may be described as "corresponding to" a particular port of another port array 250. For example, a first port of port array 250-1 (e.g., a port associated with a beam represented by a top-most dashed line emanating from port array 250-1 in FIG. 2B) may be described as corresponding to a first port of port array 250-P (e.g., a port associated with a beam represented by a top-most solid line emanating from port array 250-P in FIG. 2B). As described below, in some implementations, beams associated with corresponding ports of different port arrays 250 may be directed via different positions on a focal plane of M×N WSS 122, whereas respective wavelength channel sub-beams, included in these beams, may be incident on the same section of second switching array 260. As such, the same section of second switching array 260 may be used to direct wavelength channel sub-beams associated with multiple corresponding ports of port arrays 250, which allows M×N WSS 122 to support add/drop at optical node 100 with a high degree count (e.g., since each of the M ports of M×N WSS 122 supports a respective degree) at a reduced cost and/or complexity as compared to a prior art M×N WSS sized to support add/drop for the same high degree count (e.g., since a larger and more complex switching array would be needed).

Returning to FIG. 2A, port array 262 includes a plurality of (N>1) ports for receiving light launched by port arrays 250 or launching beams of light into the switch core of M×N WSS 122. In M×N WSS 122, N ports of port array 262 are arranged in a one-dimensional array (e.g., a vertical column). For example, port array 262 may include N ports, where the N ports are aligned in the vertical direction. In some implementations, the number of N ports of M×N WSS 122 may be in a range from, for example, 4 to 100 (e.g., M×N WSS 122 may be a 16×64 WSS).

In some implementations, ports of the multiple port arrays 250 and ports of port array 262 are optically coupled to optical fibers or waveguides. For example, each port array 250 may be optically coupled to an input fiber array and port array 262 may be optically coupled to an output fiber array.

Optionally, each input optical fiber/waveguide and each output optical fiber/waveguide may be optically coupled to a collimating/focusing lens centered on the optical axis thereof. For example, the multiple port arrays 250 and port array 262 may be optically coupled to multiple input fiber arrays and an output fiber array, respectively, that terminate in respective microlens arrays. In some implementations, an end of each input optical fiber/waveguide and an end of each output optical fiber/waveguide may be provided with an expanded core. In some implementations, the input fiber array may be coupled to a planar waveguide concentrator in which a waveguide spacing matches a fiber spacing on a first end coupled to the input fiber array, and the waveguide spacing is smaller than the fiber spacing on a second end. In some implementations, providing each optical fiber/waveguide with a collimating/focusing lens, an expanded core, or a waveguide concentrator allows a number of input ports and/or output ports of M×N WSS 122 to be increased.

Lens 252-1 (e.g., including lens 252-1.1 through lens 252-1.P), lens 252-2, lens 252-3, and lens 252-4 include lenses for focusing, collimating, and/or directing beams of light within M×N WSS 122. For example, lens 252-1, lens 252-2, lens 252-3, and lens 252-4 may be spherical lenses.

Lens 252-1 includes one or more lenses for focusing, collimating, directing, and/or the like, beams of light associated with a port array 250. For example, as shown in FIG. 2B, lens 252-1.1 may be arranged to focus beams of light, launched by respective ports of port array 250-1 (e.g., five are shown in FIG. 2B), at a first position on a focal plane associated with first switching array 254 (e.g., identified as position A in FIG. 2B), while lens 252-1.P may be arranged to focus beams of light, launched by respective ports of port array 250-P, at a second position on the focal plane associated with first switching array 254 (e.g., identified as position M2 in FIG. 2B).

In some implementations, lens 252-1 may include multiple, separate lenses (e.g., lenses that are separated by free-space of M×N WSS 122). For example, lens 252-1.P may be offset from lens 252-1.1 in the lateral direction (e.g., as shown in FIG. 2A) and in the vertical direction (e.g., as shown in FIG. 2B). In some implementations, a given lens 252-1 may be offset from another lens 252-1 in a manner similar to that described above with regard to port arrays 250.

Additionally, or alternatively, lens 252-1 may include a single lens. For example, when port arrays 250 are included in a single port array (e.g., a single vertical column, as described above), then lens 252-1 may include a single lens. Additional details and example implementations of such configurations are described below with regard to FIGS. 4 and 5.

In some implementations, lens 252-1 and lens 252-2 may have different focal lengths in order to form a beam expander or reducer that increases or decreases separation, in the vertical direction, respectively, among beams within M×N WSS 122. For example, lens 251-1.1 (with focal length f1) and lens 252-2 (with focal length f2 that differs from focal length f1) may form a beam expander that increases separation among beams launched by port array 250-1 (e.g., in order to match a separation, in the vertical direction, between rows of switching elements of second switching array 260). Alternatively, a given lens 252-1 and lens 252-2 may have the same focal length (e.g., focal length f1 is equal to focal length f2).

In a forward direction of propagation (e.g., from first switching array 254 toward second switching array 260), lens 252-2 may be arranged such that a beam of light (e.g., a beam launched by a given port array 250 when M×N WSS 122 operates to drop an optical signal at optical node 100, or a wavelength channel sub-beam incident on first switching array 254 when M×N WSS 122 operates to add an optical signal at optical node 100) is focused by lens 252-2 at spot 264 on a focal plane of mirror 256. The focal plane of mirror 256 is represented by the dashed line passing through spot 264 in FIG. 2A and the downward arrow in FIG. 2B.

In a reverse direction of propagation (e.g., from second switching array 260 toward first switching array 254), when M×N WSS 122 operates to drop an optical signal at optical node 100, lens 252-2 may operate as an angle-to-offset converter for converting vertical angles of dispersed wavelength channel sub-beams (e.g., vertical angles introduced by second switching array 260) to vertical offsets at first switching array 254, and to convert vertical offsets of the dispersed wavelength channel sub-beams (e.g., corresponding to vertical positions of the ports of an associated port array 250) to vertical angles at first switching array 254.

As shown, in some implementations, lens 252-3 and lens 252-4 may be disposed between first switching array 254 and port array 262. In some implementations, lens 252-3 and lens 252-4 may have different focal lengths in order to form a beam reducer or separator that decreases or increases separation among wavelength channel sub-beams in a vertical direction. For example, lenses 252-3 and 252-4 may form a beam reducer in order to match a separation among port array 262 when M×N WSS 122 operates to drop optical signals. Alternatively, lens 252-3 and lens 252-4 may have the same focal length.

First switching array 254 includes elements to direct beams of light. For example, in the reverse direction of propagation and when M×N WSS 122 operates to drop optical signals at optical node 100, first switching array 254 may include N switching elements to reflect wavelength channel sub-beams, converged by dispersive element 258, to respective ports of port array 262. Conversely, in the reverse direction of propagation and when M×N WSS 122 operates to add optical signals at optical node 100, first switching array 254 may include one or more mirrors (e.g., arranged at a fixed angle or tiltable) to reflect beams, including one or more wavelength channel sub-beams, to port arrays 250.

In addition, first switching array 254 may introduce vertical angles which are converted by lens 252-2 into vertical offsets and imaged by mirror 256 onto second switching array 260. Here, vertical offsets at second switching array 260 correspond to vertical positions of the ports in port arrays 250.

In some implementations, first switching array 254 includes N switching elements, each associated with one of the N ports of port array 262. For example, in some implementations, first switching array may include one or more liquid crystal on silicon (LCoS) switching arrays, one or more arrays of tiltable micro-electro-mechanical systems (MEMS) mirrors, and/or the like. As a particular example, in some implementations, first switching array 254 may include an array (e.g., a one-dimensional array) of tiltable MEMS mirrors, where each MEMS mirror is associated with one of the N ports of port array 262. In some implementations, first switching array 254 may include a single array (e.g., including each of the N switching elements). Alternatively, first switching array 254 may include multiple arrays (e.g., each including a subset of the N switching elements) that are separated in space.

When M×N WSS 122 operates to drop optical signals at optical node 100, first switching array 254 couples a wavelength channel sub-beam, incident on a switching element of first switching array 254, to a corresponding port of port array 262. Which wavelength channel sub-beam is coupled depends on a vertical angle applied by second switching array 260. Conversely, when M×N WSS 122 operates to add optical signals at optical node 100, first switching array 254 directs a wavelength channel sub-beam, incident on a switching element of first switching array 254, on an optical path toward second switching array 260. As shown in FIG. 2A, in some implementations, first switching array 254 may be disposed such that the wavelength channel sub-beams are reflected to first switching array by mirror 256 (via lens 252-2).

In some implementations, first switching array 254 may include one or more elements for directing beams launched by or to be provided to port arrays 250. For example, when M×N WSS 122 operates to drop optical signals at optical node 100 and with reference to the dashed lines FIG. 2B, first switching array 254 may include an element at a first position (e.g., position A) that directs beams, launched by ports of port array 250-1, on an optical path toward spot 264 on the focal plane of mirror 256. Here, as further shown in FIG. 2B, first switching array 254 may include an element at a second position (e.g., position M2) that directs beams, launched by ports of port array 250-P, on an optical path toward spot 264 on the focal plane of mirror 256.

As another example, when M×N WSS 122 operates to add optical signals at optical node 100 and with reference to the dashed lines FIG. 2B, first switching array 254 may include an element at the first position (e.g., position A) that directs beams, to be provided to ports of port array 250-1, to the respective ports of port array 250-1 (via lens 252-1.1). Here, as further shown, first switching array 254 may include an element at the second position (e.g., position M2) that directs beams, to be provided to ports of port array 250-P, to the respective ports of port array 250-P (via lens 252-1.P).

In some implementations, the elements for directing beams launched by or to be provided to port arrays 250 may include multiple elements (e.g., two or more separate elements). For example, the elements for directing the beams may include a total of P elements, each associated with a different port array 250. In some implementations, the multiple elements may include one or more mirrors (e.g., tiltable mirrors or mirrors arranged at a fixed or semi-permanent lateral angle), one or more gaps or openings in first switching array 254 (e.g., such that a beam passes through the one or more gaps and/or openings), and/or the like.

Additionally, or alternatively, the elements for directing beams launched by or to be provided to port arrays 250 may include a single element that is arranged to direct beams provided by multiple port arrays 250. For example, the elements for directing the beams may include a single mirror (e.g., a tiltable mirror or a mirror arranged at a fixed or semi-permanent lateral angle), a single gap or opening in first switching array 254, and/or the like.

Mirror 256 includes an element for reflecting and/or directing beams among elements of M×N WSS 122. For example, as shown in FIG. 2A, mirror 256 may include a concave mirror. In some implementations, dispersive element 258 and/or second switching array 260 may be disposed at a focal plane of mirror 256 (e.g., such that light, reflected by mirror 256, is either focused or collimated at dispersive element 258 and second switching array 260). As shown in FIG. 2A, in the forward direction of propagation, mirror 256 may be arranged to reflect a beam of light to dispersive element 258, and to reflect dispersed wavelength channel sub-beams, after dispersion by dispersive element 258, to second switching array 260. In the reverse direction of propagation, mirror 256 may be arranged to reflect the dispersed wavelength channel sub-beams, after vertical steering by second switching array 260, to dispersive element 258, and to reflect wavelength channel sub-beams, converged by dispersive element 258 from groups of dispersed wavelength channel sub-beams, to first switching array 254 (via lens 252-2). Notably, while mirror 256 is shown as a concave mirror in FIG. 2, in some implementations, mirror 256 may be a lens or another type of element capable of reflecting and/or directing beams among elements of M×N WSS 122. For example, mirror 256 may be a lens when elements of M×N WSS 122 are arranged in an unfolded arrangement.

Dispersive element 258 includes an element to separate a beam of light into dispersed wavelength channel sub-beams, and combine (e.g., converge) groups of dispersed wavelength channel sub-beams, based on wavelength. For example, dispersive element 258 may include a diffraction grating, a prism, an Echelle grating, a grism, and/or the like. In some implementations, as shown in FIG. 2A, dispersive element 258 may be disposed at the focal plane of mirror 256.

In the forward direction of propagation, dispersive element 258 is capable of separating (e.g., spreading or angular divergence) a beam of light (e.g., a beam launched by port array 250, a beam launched by port array 262) into L (L>1) sub-beams, each carrying a wavelength channel of the beam that includes one or more wavelengths in a particular range of wavelengths (herein referred to as dispersed wavelength channel sub-beams). L is a number of wavelength channels, present in M×N WSS 122, to be dispersed by dispersive element 258. As shown in FIG. 2A, in some implementations, dispersive element 258 is oriented such that the L dispersed wavelength channel sub-beams are separated (i.e., spread or angularly diverged) in a plane parallel to the y-z plane (e.g., such that each dispersed wavelength channel sub-beam is reflected by dispersive element 258 at a different angle in a lateral direction). As further shown, the L dispersed wavelength channel sub-beams are coupled to second switching array 260 by mirror 256 (e.g., such that each of the L dispersed wavelength channel sub-beams, associated with a given beam, is incident on a different switching element of second switching array 260).

In the reverse direction of propagation, dispersive element 258 is capable of combining (e.g., angularly converging) groups of dispersed wavelength channel sub-beams in the lateral direction to form wavelength channel sub-beams (e.g., each including one or more dispersed wavelength channel sub-beams). In some implementations, dispersive element 258 is oriented to combine the groups of dispersed wavelength channel sub-beams in the lateral direction. The respective vertical angles, applied to the dispersed wavelength channel sub-beams by second switching array 260, are transformed into vertical positions on dispersive element 258 by the angle-to-offset property of mirror 256. A group of dispersed wavelength channel sub-beams that have had the same vertical angle applied by second switching array 260 reach the same vertical position on dispersive element 258, and may be combined into a wavelength channel sub-beam if these beams also have a same vertical angle as they are incident on dispersive element 258.

Second switching array 260 includes an array of switching elements for independent routing of dispersed wavelength channel sub-beams. For example, second switching array 260 may include a two-dimensional LCoS phased array, a two-dimensional array of pistoning MEMS mirrors (e.g., a MEMS phased array), a two-dimensional array of tiltable MEMS mirrors, and/or the like. In some implementations, second switching array 260 includes K rows of L switching elements, where K is greater than or equal to a number of ports in the port array 250 with the greatest number of ports. For example, if M×N WSS 122 includes three port arrays 250 (e.g., P=3), each including a total of M/3 ports, then second switching array 260 may include a total of M/3 (e.g., K=M/3) rows of L switching elements. As another example, if M×N WSS 122 includes two port arrays 250 (e.g., P=2), where a first port array 250 includes a total of ((M/2)−2) ports and a second port array 250 includes a total of ((M/2)+2) ports, then second switching array 260 may include a total of ((M/2)+2) (e.g., K=((M/2)+2)) rows of L switching elements. In FIG. 2A, one row of the K rows of L switching elements is shown (i.e., the K rows are stacked in the vertical direction in FIG. 2A).

In some implementations, second switching array 260 is disposed such that elements of a given row may be illuminated by dispersed wavelength channel sub-beams included in beams associated with corresponding ports of different port arrays 250. For example, a first row of second switching array 260 may be disposed such that elements of the first row may be illuminated by dispersed wavelength channel sub-beams included in beams launched by corresponding first ports of a different port arrays 250 (i.e., beams launch by the first port of each port array 250). In other words, the wavelength channel sub-beams, included in the beams launched by the first ports of port arrays 250, may be incident on the same section (e.g., the same row of elements) of second switching array 260. Additional details of such operation are described below.

In some implementations, a switching element of second switching array 260 may steer a dispersed wavelength channel sub-beam, incident thereon, in a vertical direction (e.g., such that the dispersed wavelength channel sub-beam is reflected at an angle with respect to the y-z plane). In some implementations, the vertical angle applied to the dispersed wavelength channel sub-beam is determined based on a control signal applied to the corresponding switching element (e.g., a signal that changes a phase of a tunable liquid crystal phase delay switching element of an LCoS switching element, a signal that tilts a MEMS mirror of a MEMS array about a steering axis that is parallel to the y-axis, and/or the like). In some implementations, the direction in which a given element of second switching array 260 steers a respective wavelength channel sub-beam is referred to as a switching direction of second switching array 260 (e.g., the switching direction in FIGS. 2A and 2B is along the x-axis). In some implementations, second switching array 260 may be disposed at the focal plane of mirror 256.

In an example operation of M×N WSS 122 being used to drop optical signals at optical node 100, a first port of port array 250-1 launches a beam (e.g., including a set of wavelength channels) via lens 252-1.1 toward a mirror of first switching array 254 for directing beams launched by port array 250-1 (e.g., a mirror arranged at position A in FIG. 2B). The mirror of first switching array 254 reflects the beam to mirror 256 (via lens 252-2), which reflects the beam to dispersive element 258. Similarly, a first port of port array 250-P (i.e., a port of port array 250-P that corresponds to the first port of port array 250-1) launches a beam (e.g., including a set of wavelength channels) via lens 252-1.P toward a mirror of first switching array 254 for directing beams launched by port array 250-P (e.g., a mirror arranged at position M2 in FIG. 2B). The mirror of first switching array 254 reflects the beam to mirror 256 (via lens 252-2), which reflects the beam to dispersive element 258.

Notably, port array 250-P uses position M2 on the focal plane associated with the first switching array 254. In some implementations, a position via which to direct beams associated with port array 250-P (e.g., position M2) may be selected such that the position is adjacent to a position used to direct beams associated with port array 250-1 (e.g., position A) in order to minimize a steering angle requirement on second switching array 260.

Figure 3A:
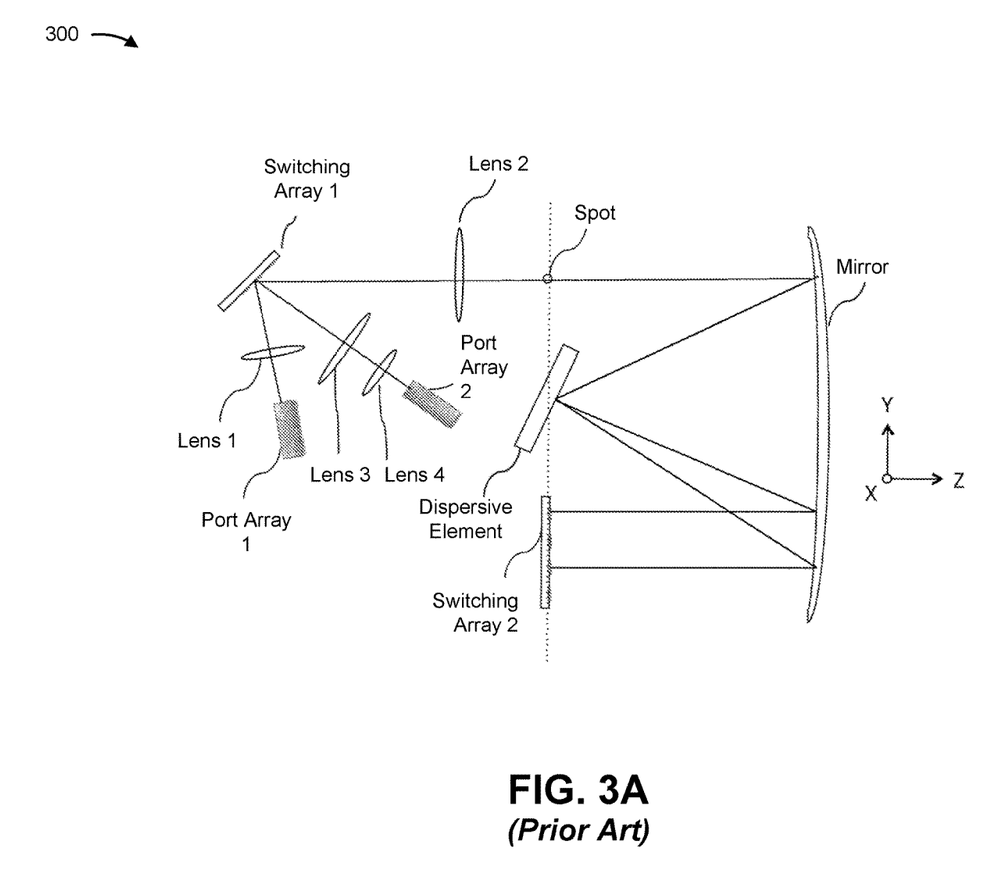
FIGS. 3A and 3B are diagrams of a prior art M×N WSS.
Figure 3B:
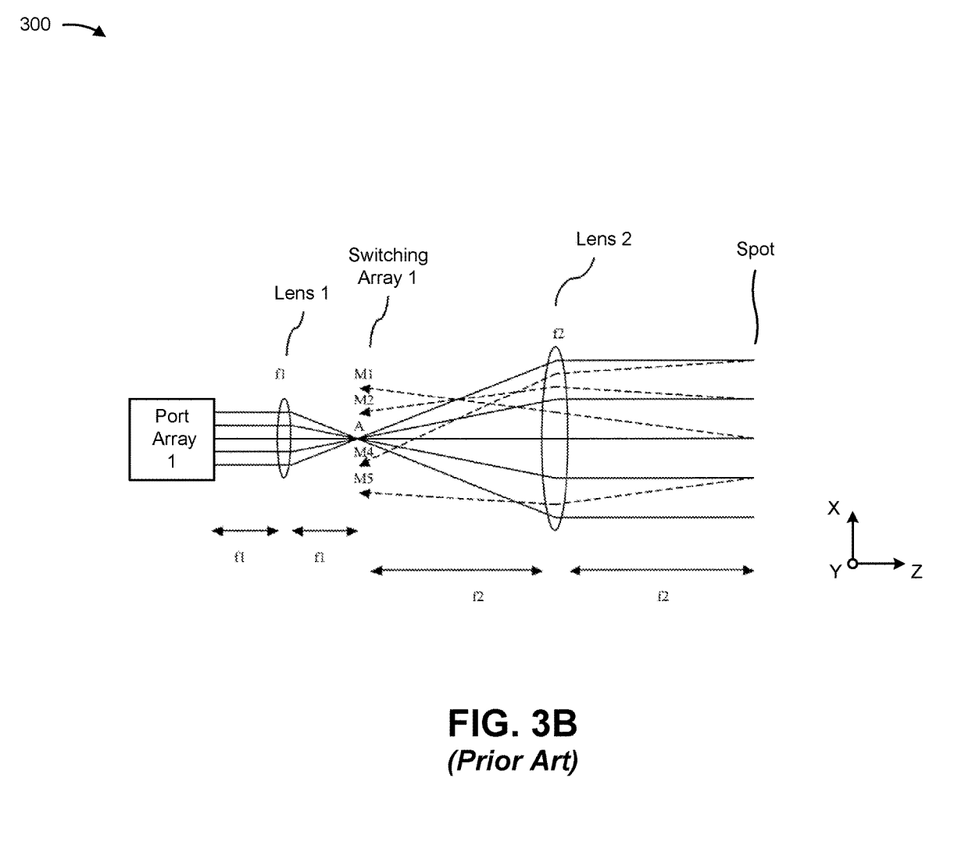

Further, since a given position may typically be used for directing light to an add/drop port (e.g., position M2 may typically be used to direct wavelength channel sub-beams to a corresponding port of port array 262, such as in the prior art M×N WSS of FIG. 3B), a total possible number of add/drop ports of M×N WSS 122 may be reduced by including multiple port arrays 250. For example, when including a second port array 250 such that an 8×26 WSS becomes an M×N WSS with 16 common ports, the total number of add drops may be reduced by one (e.g., such that the M×N WSS is a 16×25 WSS). In some implementations, one or more other corresponding add/drop ports may also be sacrificed in order to improve performance of M×N WSS 122. For example, continuing with the above case, position M4 may not be used in association with directing light to/from an add/drop port since zero order reflection from second switching array 260 going in position M2 will come out at position M4. Thus, in this case, a 16×24 WSS may be configured. However, even in such a case where the total number of add/drop ports is reduced, the cost per add/drop port of M×N WSS 122 that is capable of supporting a particular degree count is significantly reduced as compared to a prior art M×N WSS that is sized to support the same particular degree count.

Dispersive element 258 separates (e.g., angularly diverges) the beams into dispersed channel wavelength sub-beams in the lateral direction, and sends the dispersed wavelength channel sub-beams to mirror 256. Mirror 256 reflects each of the dispersed wavelength channel sub-beams to a respective switching element in one of K rows of switching elements of second switching array 260. Notably, the dispersed wavelength channel sub-beams, included in the beam launched by port array 250-1, and the dispersed wavelength channel sub-beams included in the beam launched by the corresponding port of port array 250-P, are incident on the same section of second switching array (e.g., the same row of switching elements).

At second switching array 260, each switching element steers a respective dispersed wavelength channel sub-beam in a respective vertical direction (e.g., by tilting to apply vertical angle to the dispersed wavelength channel sub-beam) back to mirror 256. Here, a vertical angle applied at second switching array 260 corresponds to a row of a port of port array 262, to which a given dispersed wavelength channel sub-beam is to be provided, is located. Mirror 256 reflects the vertically angled dispersed wavelength channel sub-beams to dispersive element 258.

Dispersive element 258 combines (e.g., angularly converges) dispersed wavelength channel sub-beams in the lateral direction (while maintaining respective angles or offsets in the vertical direction) to form a set of wavelength channel sub-beams, and sends the wavelength channel sub-beams to mirror 256. Mirror 256 reflects the wavelength channel sub-beams to first switching array 254 via lens 252-2. Lens 252-2 converts the vertical angles of the wavelength channel sub-beams (e.g., corresponding to the row of the target port) to vertical offsets at first switching array 254, and converts vertical offsets of the wavelength channel sub-beams (e.g., corresponding to vertical positions of the ports of port arrays 250) to vertical angles at first switching array 254.

The wavelength channel sub-beams illuminate corresponding switching elements of first switching array 254. A switching element of first switching array 254 selects (e.g., by tilting) a port of port arrays 250 to be coupled to a port of port array 262 associated with the switching element, and reflects a wavelength channel sub-beam, incident on the switching element, to the port of port array 262. In this way, any wavelength channel launched by a given port of any port array 250 is independently switchable to any one of the N ports of port array 262. As described above, such switching controlled using tilt angles of corresponding switching elements of second switching array 260 and first switching array 254. As noted above, the example operation of M×N WSS 122 is provided for illustrative purposes, and other examples are possible.

The number and arrangement of elements shown and described in association with FIGS. 2A and 2B are provided as examples. In practice, M×N WSS 122 may include additional elements, fewer elements, different elements, differently arranged elements, and/or differently sized elements than those shown in FIGS. 2A and 2B. For example, in some implementations, elements of M×N WSS 122 may be arranged such that M×N WSS 122 includes two separate dispersive elements (e.g., a first dispersive element to separate beams of light into dispersed wavelength channel sub-beams, and a second dispersive element to combine groups of dispersed wavelength channel sub-beams to form wavelength channel sub-beams). Further, references to vertical directions, lateral directions, particular planes, x, y, and z axes and/or directions, and/or the like, are merely examples provided to give context associated with the description of M×N WSS 122.

Notably, M×N WSS 122 includes at least two sets of common ports (i.e., at least two port arrays 250) in order to allow M×N WSS 122 to support add/drop at a high degree count (e.g., since each port of port arrays 250 is capable of supporting a different degree). As indicated above, inclusion of the multiple sets of common ports allows M×N WSS 122 to support the high degree count with a reduced cost and/or complexity as compared to using a prior art M×N WSS to support the same high degree count. For example, as described above, a set of wavelength channel sub-beams, associated with a first port of a first port array 250, and a set of wavelength channel sub-beams, associated with a first port of a second port array 250 (e.g., a corresponding port), are incident on the same section of second switching array 260. As such, the same section of second switching array 260 may be used to steer wavelength channel sub-beams associated with different common ports. Conversely, in the prior art M×N WSS design, separate sections of a switching array would be needed to steer wavelength channel sub-beams associated with different ports. Thus, in order to increase the degree count (i.e., in order to add common ports), a larger and more complex switching array would be required.

In some implementations, since corresponding ports of two or more port arrays 250 may share a same section of second switching array 260, wavelength contention may be possible (e.g., when a pair of beams launched by corresponding ports of port arrays 250 include the same wavelength channel). However, the possibility of such contention may be small and, thus, an impact on network performance may be negligible. For example, assume that a 16×25 WSS 122 includes a first port array 250 with 8 input ports and a second port array 250 with 8 input ports and a port array 262 with 25 output ports, where each input port is capable of providing 96 wavelength channels. Here, the 16×25 WSS 122 is capable of switching a total of 1536 wavelength channels (e.g., 16×96=1536). However, when the first port array 250 and the second port array 250 are arranged as described herein, second switching array 260 may include 768 switching elements (e.g., half the number needed for a prior art M×N WSS in order to switch 1536 wavelength channels), where a given row of second switching array 260 may be shared by a port of the first port array 250 and a corresponding port of the second port array 250. In this example, even though second switching array 260 may include 768 switching elements, only 25 of these switching elements may be used at a given time (e.g., since only one wavelength channel may be provided to a given add/drop at a given time). Here, even if 24 wavelength channels of the 1536 possible wavelength channels are being routed to 24 output ports of port array 262, then a chance that a wavelength channel that is to be routed to the 25$^{th}$ output port of port array will experience contention is approximately equal to 1.5% (e.g., 24/1536=1.56%). As such, wavelength contention may not significantly impact network performance of M×N WSS 122.

Further, in some implementations, contentionless operation may be guaranteed when optical node 100 includes at least two pairs of M×N WSSs 122. For example, FIG. 1 shows optical node 100 including an M×N WSS 122 operating to drop optical signals (e.g., M×N WSS 122-1) and an M×N WSS 122 operating to add optical signals (e.g., M×N WSS 122-2). If optical node 100 includes another M×N WSS 122 operating to drop optical signals (e.g., M×N WSS 122-3) (not shown, but arranged in a similar manner as M×N WSS 122-1), and another M×N WSS 122 operating to add optical signals (e.g., M×N WSS 122-4) (not shown, but arranged in a similar manner as M×N WSS 122-2), then contentionless operation of optical node 100 is guaranteed.

For example, if a wavelength channel is being routed on a particular degree 102 (e.g., via a particular port in a first port array 250 of M×N WSS 122-1) for drop at M×N WSS 122-1, then the same wavelength channel may not be routed on a corresponding degree 102 (e.g., via a port in a second port array 250 of M×N WSS 122-1 that corresponds to the particular port of the first port array 250) for drop at M×N WSS 122-1 due to wavelength contention. Here, wavelength contention arises since the wavelength channel on the particular degree (e.g., launched by the particular port of the first port array 250) and the wavelength channel on the corresponding degree (e.g., launched by the corresponding port of the second port array 250) would be incident on the same switching element of second switching array 260. However, since optical node 100 includes M×N WSS 122-3, contentionless operation may be guaranteed. For example, since the wavelength channel is being routed on the particular degree for drop at M×N WSS 122-1, then the particular degree cannot route the wavelength channel to M×N WSS 122-3 (e.g., since a given degree may not route the same wavelength channel to both M×N WSS 122-1 and M×N WSS 122-3). Thus, the wavelength channel may be routed on the corresponding degree for drop at M×N WSS 122-3 without contention. As such, in an optical node where flexibility exists to route a wavelength channel to one of multiple M×N WSSs 122, contentionless operation is provided.

FIGS. 3A and 3B are diagrams of a prior art M×N WSS 300 provided for comparison to M×N WSS 122. As shown in FIG. 3A, prior art M×N WSS 300 includes port array 1, a group of lenses (lens 1 through lens 4), switching array 1, a mirror, a dispersive element, switching array 2, and port array 2. Of note, prior art M×N WSS 300 includes a single port array 1 (e.g., rather than a set of port arrays 250, as included in M×N WSS 122). In other words, prior art M×N WSS 300 does not include an arrangement of ports that allow the same section of switching array 2 to be used to steer wavelength channel sub-beams associated with different ports of port array 1. Thus, in order to increase the degree count of prior art M×N WSS 300, in addition to adding ports to port array 1, a larger and more complex switching array 2 would be needed.

Figure 4:
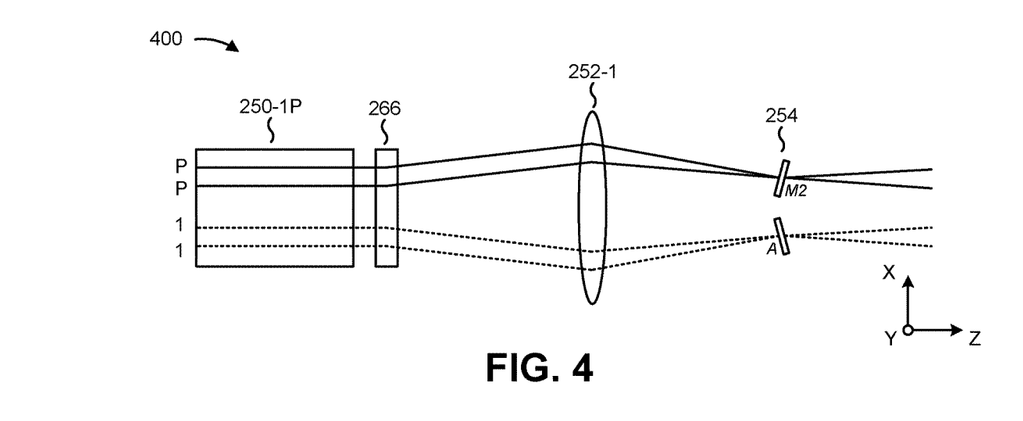
FIGS. 4 and 5 are diagrams of additional example implementations of the M×N WSS included in the optical node of FIG. 1.
Figure 5:
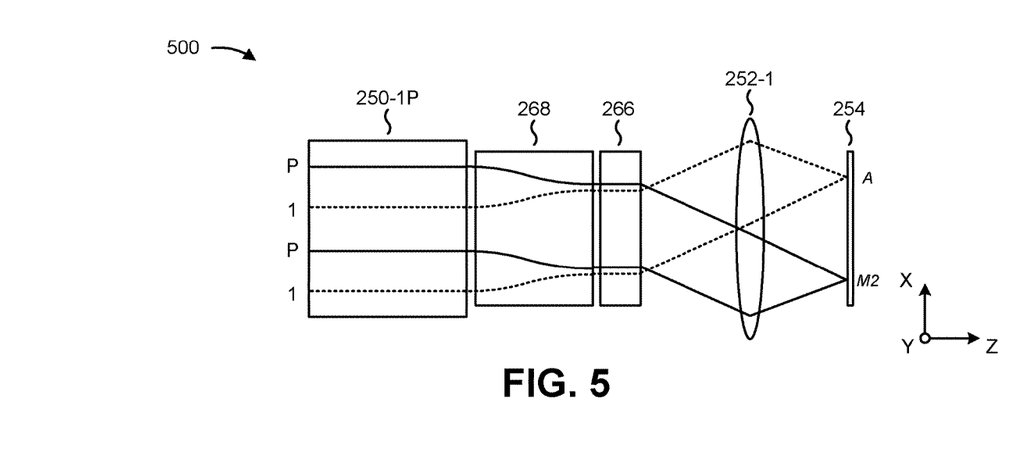

FIGS. 4 and 5 are diagrams of other example implementations 400 and 500 of M×N WSS 122 of optical node 100. More specifically, FIG. 4 and FIG. 5 are example implementations 400 and 500 associated with combining the multiple port arrays 250 in single port array. In some implementations, combining port arrays 250 in a single port array may, for example, reduce a cost and/or assembly difficulty of M×N WSS 122 (e.g., as compared to including separate port arrays).

As shown in FIG. 4, in some implementations, M×N WSS 122 may include port array 250-1P, a lens array 266, lens 252-1, and first switching array 254. As shown, in some implementations, port array 250-1P may include P sets of ports (i.e., P port arrays including a total of M ports), where ports of a given set are grouped together and aligned with other sets of ports in the vertical direction. For example, in FIG. 4, port array 250-1P includes a port set 1 including two ports and a port set P including two ports, and the sets of ports are grouped together and aligned along the x-axis of M×N WSS 122.

Lens array 266 includes an array of lenses (e.g., a microlens array) for directing a beam, associated with a given set of ports, at a particular angle. For example, as shown in FIG. 4 and when M×N WSS 122 operates to drop optical signals at optical node 100, lens array 266 may include a first lens to direct beams, associated with port set 1, at a first (e.g., downward) angle toward lens 252-1, and a second lens to direct beams, associated with port set P, at a second (e.g., upward) angle toward lens 252-1. In some implementations, lens array 266 may be offset from port array 250-1P in a direction parallel to the y-z plane in order to angle the beams in this manner.

As shown in FIG. 4, beams launched by port set 1 are focused by lens 252-1 (e.g., a single spherical lens) at position A on a focal plane of first switching array 254, while beams launched by port set P are focused by lens 252-1 at position M2 on the focal plane of first switching array 254. As described above, first switching array 254 may include a first element (e.g., a tiltable mirror, a mirror in a fixed or semi-permanent position, a gap, an opening, and/or the like) at position A for directing the beams launched by port set 1 toward the switch core of M×N WSS 122. Similarly, first switching array 254 may include a second element (e.g., a tiltable mirror, a mirror in a fixed or semi-permanent position, a gap, an opening, and/or the like) at position M2 for directing the beams launched by port set P toward the switch core of M×N WSS 122. In FIG. 4, the first element and the second element are separate elements. As further shown, the first and second elements of first switching array 254 may be tilted at comparatively different angles in order to cause corresponding beams (e.g., beam launched by a particular port in port set 1 and a beam launched by a corresponding port in port set P) to be substantially parallel when entering the switch core of M×N WSS 122.

In some implementations, the example implementation shown in FIG. 4 may reduce loss associated with M×N WSS 122 (e.g., as compared to the example implementation shown in FIG. 5). For example, since no waveguide is arranged between port array 250-1P and lens array 266 (e.g., as with example implementation 500), insertion loss associated with M×N WSS 122 may be reduced and/or eliminated.

As shown in FIG. 5, in some implementations, M×N WSS 122 may include port array 250-1P, lens array 266, a waveguide 268, lens 252-1, and first switching array 254. As shown, in this implementation, port array 250-1P may include P sets of ports (i.e., P port arrays including a total of M ports), where ports of a given set are interleaved with another set of ports and aligned with other sets of ports in the vertical direction. For example, in FIG. 5, port array 250-1P includes a port set 1 including two ports and a port set P including two ports, and the sets of ports are interleaved and aligned along the x-axis of M×N WSS 122.

Waveguide 268 includes a device, such as a planar lightwave circuit (PLC), for changing spacing between beams associated with two or more ports of port array 250-1P. For example, as shown in FIG. 5, and when M×N WSS 122 operates to drop optical signals at optical node 100, waveguide 268 may reduce spacing between a beam launched by a lower port in port set 1 and a beam launched by a lower port in port set P. Similarly, waveguide 268 may reduce spacing between a beam launched by an upper port in port set 1 and a beam launched by an upper port in port set P. In some implementations, waveguide 268 may be butt-coupled to port array 250-1P.

As further shown, lens array 266 may be arranged such that a given group of beams (e.g., a group of beams including a beam launched by a port in port set 1 and a beam launched by a corresponding port in port set P) propagate through a single lens of lens array 266. Here, as shown, the single lens angles beams, included in the group of beams, in different directions. For example, as shown in FIG. 5, a group of beams, including the beam launched by the upper port in port set 1 and the beam launched by the upper port in port set P, propagates through an upper lens in lens array 266. As shown, the upper lens of lens array 266 angles the beam launched by the upper port in port set 1 in an upward direction, and angles the beam launched by the upper port in port set P in a downward direction. As shown, the beams launched by the lower ports in port sets 1 and P may be similarly angled by the lower lens in lens array 266.

As further shown in FIG. 5, beams launched by port set 1 are focused by lens 252-1 (e.g., a single spherical lens) at position A on a focal plane of first switching array 254, while beams launched by port set P are focused by lens 252-1 at position M2 on the focal plane of first switching array 254. In this example, as shown, corresponding beams (e.g., a beam launched by a particular port in port set 1 and a beam launched by a corresponding port in port set P), are incident on the focal plane associated with first switching array 254 at the same angle. Thus, first switching array 254 may include a single element (e.g., a tiltable mirror, a mirror in a fixed or semi-permanent position, a gap, an opening, and/or the like) that is arranged at position A and position M2 for directing the beams toward the switch core of M×N WSS 122. In some implementations, the example implementation shown in FIG. 5 may increase manufacturability and/or reliability of M×N WSS 122 (e.g., as compared to the example implementation shown in FIG. 4) due to use of a single element at position A and M2 (e.g., since tolerancing issues may arise when angling separate first and second elements of first switching array 254).

The number and arrangement of elements shown in FIGS. 4 and 5 are provided as examples. In practice, M×N WSS 122 may include additional elements, fewer elements, different elements, differently arranged elements, and/or differently sized elements than those shown and/or described in FIGS. 4 and 5.

Some implementations described herein provide a design for an M×N WSS that is capable of supporting add/drop at an optical node with a high degree count by including multiple sets of common ports in the M×N WSS (e.g., whereas a prior art M×N WSS includes only one set of common ports). As described in further detail below, inclusion of the multiple sets of common ports provides support for the high degree count, with a relatively small impact on the cost and complexity of the M×N WSS (e.g., as compared to using a prior art design for an M×N WSS in order to support the same high degree count). Thus, capacity at the optical node can be increased without a significant increase in cost or complexity of M×N WSSs in the optical node.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A wavelength selective switch (WSS), comprising:
   a first set of ports, each to launch a respective beam of a first set of beams,
      wherein the first set of beams is provided to a first position on a focal plane associated with the WSS, and
      wherein a first set of wavelength channel sub-beams, included in a beam of the first set of beams, is to be incident on a particular section of a switching array of the WSS; and
   a second set of ports, each to launch a respective beam of a second set of beams,
      wherein the second set of beams is provided to a second position on the focal plane associated with the WSS, wherein the second position is different from the first position, and
      wherein a second set of wavelength channel sub-beams, included in a beam of the second set of beams, is to be incident on the particular section of the switching array.

2. The WSS of claim 1, wherein the first set of ports is offset from the second set of ports in a direction that is parallel to a switching direction of the switching array and in a direction that is perpendicular to the switching direction of the switching array.

3. The WSS of claim 1, wherein the first set of ports and the second set of ports are included in separate port arrays.

4. The WSS of claim 1, further comprising:
   a first lens to direct the first set of beams to the first position on the focal plane, and
   a second lens to direct the second set of beams to the second position on the focal plane.

5. The WSS of claim 1, wherein the switching array is a second switching array, and
   wherein the WSS further comprises a first switching array including:
      a first element arranged at the first position on the focal plane associated with the WSS; and
      a second element arranged at the second position on the focal plane associated with the WSS,
         wherein the second element and the first element are separate elements.

6. The WSS of claim 1, wherein the first set of ports and the second set of ports are included in a single port array.

7. The WSS of claim 6, further comprising a lens array including:
   a first set of lenses to direct the first set of beams at a first angle for focusing at the first position on the focal plane, and
   a second set of lenses to direct the second set of beams at a second angle for focusing at the second position on the focal plane,
      wherein the first angle and the second angle are different angles.

8. The WSS of claim 6, wherein the first set of ports is interleaved with the second set of ports in the single port array.

9. The WSS of claim 8, further comprising:
   a planar lightwave circuit to reduce spacing between a pair of beams including a particular beam, included in the first set of beams, and a particular beam included in the second set of beams.

10. The WSS of claim 8, wherein the switching array is a second switching array, and
    wherein the WSS further comprises a first switching array including a single element arranged at the first position on the focal plane associated with the WSS and the second position on the focal plane associated with the WSS.

11. The WSS of claim 1, wherein the first position and the second position are adjacent positions on the focal plane associated with the WSS.

12. A wavelength selective switch (WSS), comprising:
    P (P>1) sets of ports,
       wherein each of a first set of ports, of the P sets of ports, is to launch a respective beam in a first set of beams,
          wherein the first set of beams is to be provided to a first position on a focal plane, and
          wherein a first set of wavelength channel sub-beams, included in a beam of the first set of beams, is to be incident on a particular section of a switching array of the WSS; and
       wherein each of a second set of ports, of the P set of ports, is to launch a respective beam of a second set of beams,
          wherein the second set of beams is to be provided to a second position on the focal plane,
             wherein the second position is different from the first position, and
          wherein a second set of wavelength channel sub-beams, included in a beam of the second set of beams, is to be incident on the particular section of the switching array; and
    the switching array to steer the first set of wavelength channel sub-beams and the second set of wavelength channel sub-beams using the particular section of the switching array.

13. The WSS of claim 12, wherein the first set of ports is offset from the second set of ports in a direction that is parallel to a switching direction of the switching array and in a direction that is perpendicular to the switching direction of the switching array.

14. The WSS of claim 12, wherein the first set of ports and the second set of ports are included in separate port arrays.

15. The WSS of claim 12, wherein the switching array is a second switching array, and
    wherein the WSS further comprises a first switching array including:

a first element arranged at the first position on the focal plane; and
a second element arranged at the second position on the focal plane,
wherein the second element and the first element are separate elements.

16. The WSS of claim 12, wherein the first set of ports and the second set of ports are included in a single port array.

17. The WSS of claim 16, wherein the first set of ports is interleaved with the second set of ports in the single port array.

18. The WSS of claim 16, further comprising:
a planar lightwave circuit to reduce spacing between a pair of beams including a particular beam, included in the first set of beams, and a particular beam included in the second set of beams.

19. The WSS of claim 16, wherein the switching array is a second switching array, and
wherein the WSS further comprises a first switching array including a single element arranged at the first position on the focal plane and the second position on the focal plane.

20. A wavelength selective switch (WSS), comprising:
a first set of ports, each to receive a respective beam of a first set of beams,
wherein the first set of beams is to be received via a first position on a focal plane associated with the WSS, and
wherein a first set of wavelength channel sub-beams, included in a beam of the first set of beams, is to be incident on a particular section of a switching array of the WSS; and
a second set of ports, each to receive a respective beam of a second set of beams,
wherein the second set of beams is to be received via a second position on the focal plane associated with the WSS,
wherein the second position is different from the first position, and
wherein a second set of wavelength channel sub-beams, included in a beam of the second set of beams, is to be incident on the particular section of the switching array.

* * * * *